R. B. BENJAMIN.
REFLECTOR.
APPLICATION FILED MAR. 21, 1914.
1,238,484.
Patented Aug. 28, 1917.
3 SHEETS—SHEET 2.
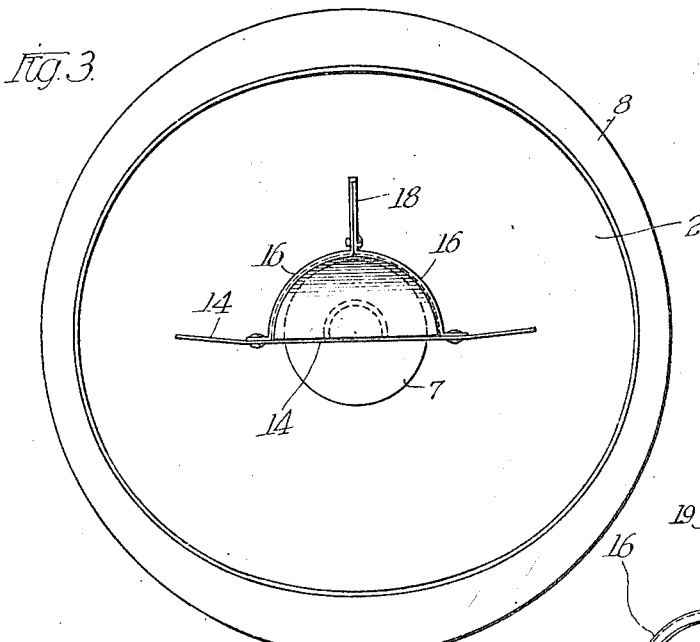
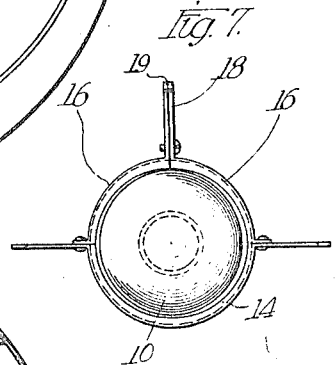
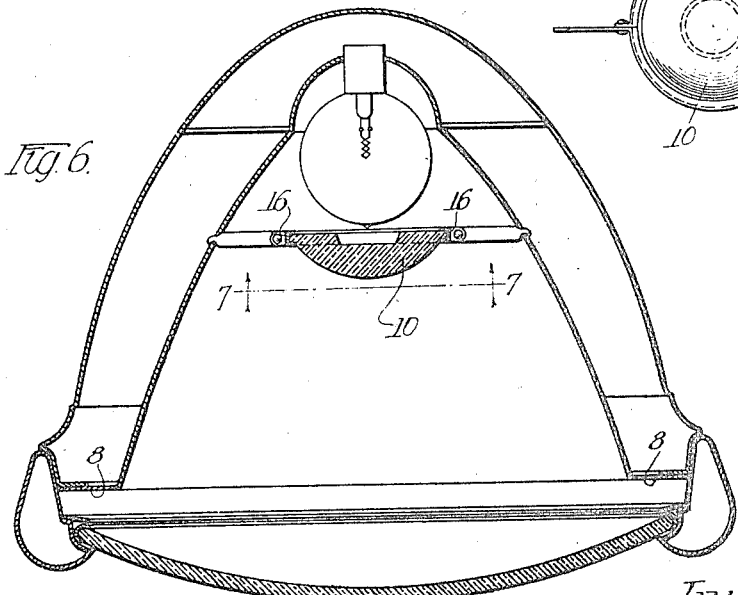
Witnesses:
Inventor
Reuben B. Benjamin
By Jones, Addington, Ames & Seibold
Attys.

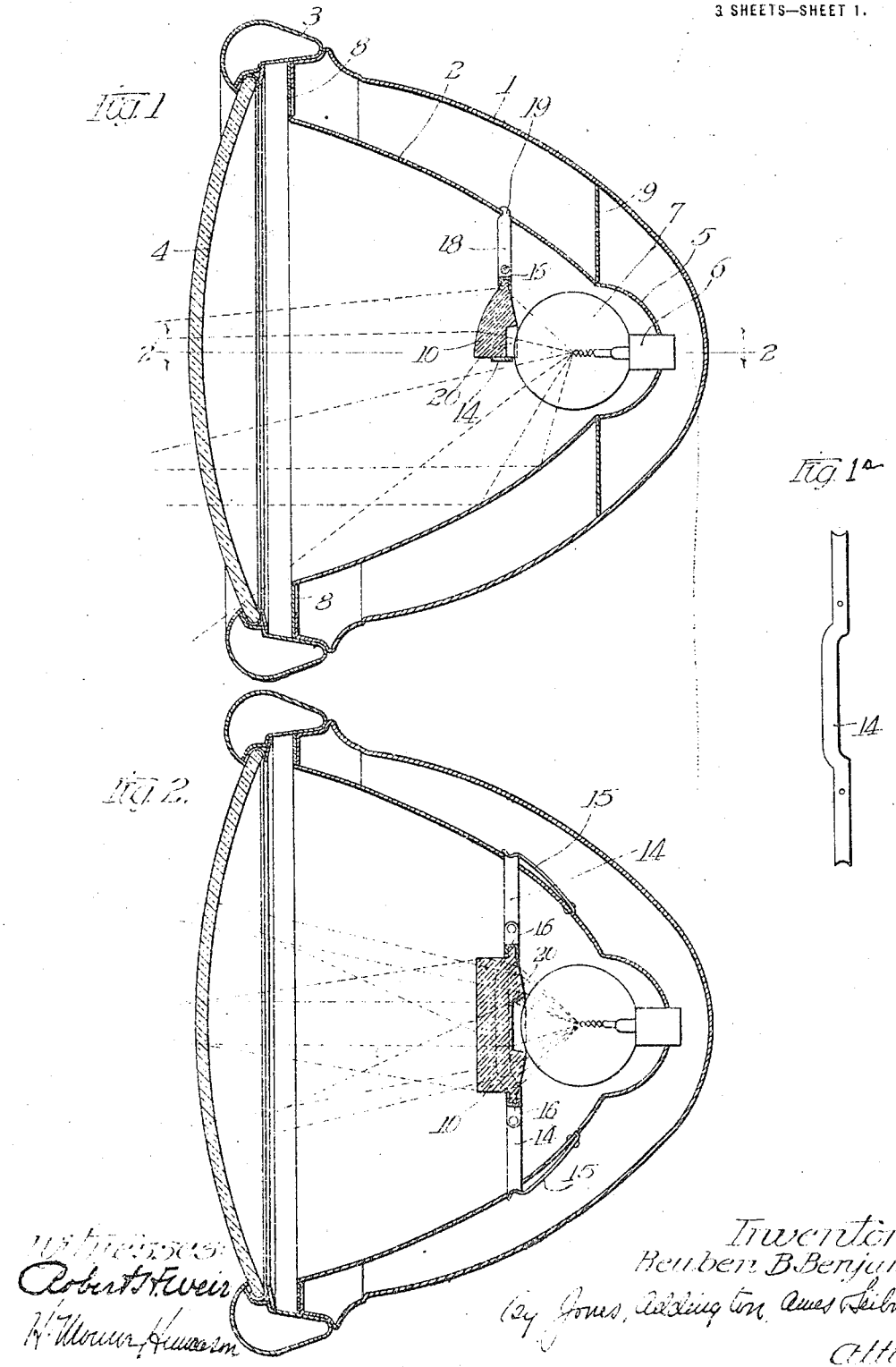

R. B. BENJAMIN.
REFLECTOR.
APPLICATION FILED MAR. 21, 1914.
1,238,484.
Patented Aug. 28, 1917.
3 SHEETS—SHEET 3.
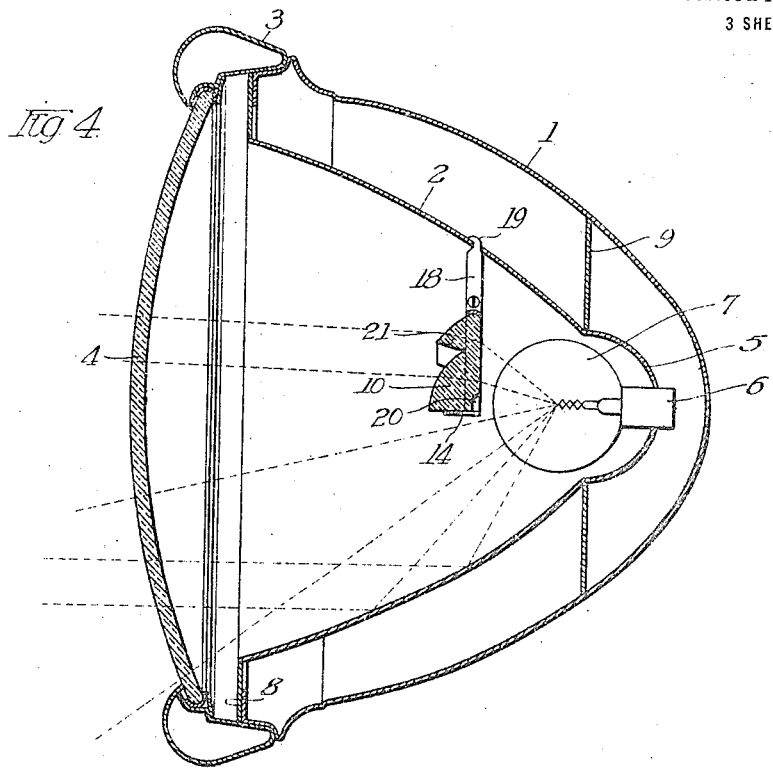
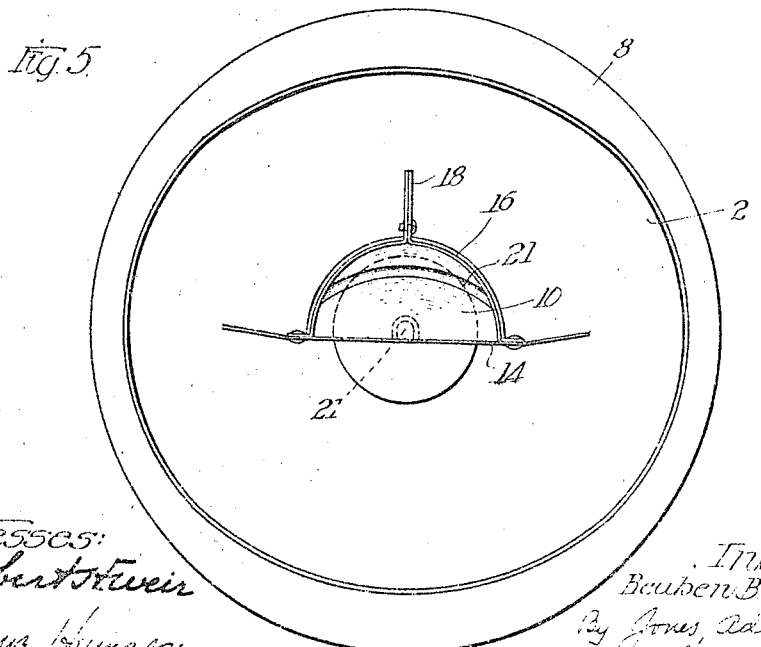

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

REFLECTOR.

1,238,484.   Specification of Letters Patent.   Patented Aug. 28, 1917.

Application filed March 21, 1914. Serial No. 826,358.

*To all whom it may concern:*

Be it known that I, REUBEN B. BENJAMIN, a citizen of the United States, residing at Chicago, in the county of Cook and State of Illinois, have invented new and useful Improvements in Reflectors, of which the following is a full, clear, concise, and exact description, reference being had to the accompanying drawing, forming a part of this specification.

My invention relates to improvements in reflectors and particularly to reflectors for use on automobile head lights.

One of the objects of my invention is to provide a reflector which will so direct the light rays as to obtain the greatest efficiency and to direct the rays in a path to give the maximum lighting to the road in front of the automobile. Another object of my invention is to provide reflectors for head lights which will so reflect and refract the light that there will be no blinding rays projected in the eyes of approaching pedestrians or drivers of other cars, and to provide means whereby the driver of the car will not be blinded by the rays of light from his own head lights.

For the purpose of disclosing my invention I have illustrated certain embodiments thereof in the accompanying drawings, in which—

Figure 1 is a longitudinal sectional view of a lamp having my improved form of reflector and refractor therein;

Fig. 1ª is a detail view of the bottom plate for supporting the lens;

Fig. 2 is a transverse sectional view taken on the line 2—2 of Fig. 1;

Fig. 3 is a front elevation of the reflector illustrated in Figs. 1 and 2;

Fig. 4 is a longitudinal view of a reflector showing a modification of the refracting lens thereof;

Fig. 5 is a front elevation thereof;

Fig. 6 is a longitudinal section of a reflector showing still another modified form of refracting lens; and Fig. 7 is a detail sectional view taken on the line 7—7 of Fig. 6.

In the embodiment of the invention illustrated in Figs. 1, 2 and 3, the usual casing 1 for a head light reflector of automobiles is provided, having arranged therein a concave reflector 2 and having mounted on its front a cover 3 provided with the usual glass front 4. The reflector is so formed that the arc thereof, in a vertical plane through its axis, forms a parabolic curve, while the arc in a horizontal plane through its axis forms a distorted curve more nearly resembling a hyperbola. The rear of the reflector terminates in a semi-spherical extension 5, and mounted in the center of this extension is the usual lamp socket 6 adapted to receive an electric lamp bulb 7. The reflector is so shaped that its front edge is elliptical, as illustrated in Fig. 3, and tapers back to the circular at the point where the semi-spherical extension meets the rear of the reflector.

In forming the reflector I have found that it is easier to form the same so that transversely all parts form true circles. By constructing it in this manner the inner reflecting surface is more easily polished and the reflector may more easily be formed up on standard dies. After the reflector has been formed I obtain the distorted shape illustrated in the drawings by squeezing the top and bottom of the reflector together, thereby causing the front portion to assume an elliptical shape, and, in order to hold the reflector in this distorted shape, I provide a clamping ring 8, the opening of which is elliptical and of the shape it is desired the front edge of the reflector to assume. This clamping ring is slipped over the reflector from the rear and not only holds the reflector in its distorted shape, but provides a supporting flange therefor. A second clamping ring 9 is secured about the reflector at the point where the reflector merges in to the semi-spherical portion. This clamping ring serves as a support for the rear end of the reflector.

With the reflector of the shape above described I am enabled to throw a beam of light, the rays of which tend to diverge horizontally due to the fact that the side portions of the reflector are distorted from the true parabolic, while the rays vertically are substantially horizontal, so that none of the reflected rays projects above the top of the reflector.

There are, however, certain direct rays emanating from the source of light, which if uninterrupted, would project beyond the top of the lamp and cause a blinding glare in front of the driver, and also be of sufficient height to throw a light in the eyes of approaching pedestrians or the drivers of other cars. In order to intercept these rays and redirect the same, and, at the same time, not lose any of their light-giving value I provide an interrupter which is placed immediately in front of and in close proximity to the lamp. This interrupter takes the form of a semi-circular lens 10 which has an arched front surface, the arch being the same all the way across, so that the upwardly projecting direct rays of the lamp will be intercepted and refracted downwardly. This lens is semi-circular and its lower end is slightly below the axis of the reflector, while in diameter it is equal to the diameter of the semi-circular rearward extension of the reflector. The lens may be supported in any desirable manner, but I have shown the same being supported upon a bottom plate 14, which extends clear across the reflector and has its ends projecting through suitable openings in the side walls of the reflector. These ends are notched, as shown, and are engaged by spring clips 15 mounted on the outside of the reflector. Secured to the bottom plate 14 are a pair of arched plates 16 which surround the ends of the lamp immediately in the center to form an upwardly extending arm 18 provided with a notched top 19 adapted to engage in a suitable slot in the top of the reflector. In this manner the lens is removable and secured in place in the reflector, and, at the same time, is held in a rigid position.

The rear face of the lens, in order that the same may be brought in closer proximity to the lens and thereby the size of the lens reduced, is cut away, as at 20, to accommodate the front tip of the lamp.

It will be seen from the above that this refracting lens, although very small in size, interrupts all of the direct rays of the lamp which otherwise would project beyond the top edge of the reflector and so refracts these rays that they take a downward course. It is, of course, unnecessary in some instances to intercept the downward direct rays as these would, of course, be projected onto the road in front of the car in any event. This lense not only intercepts and refracts certain of the direct rays of the lamp, but also intercepts and refracts the reflected rays from the semi-spherical portion in the back of the lamp, which reflected rays would otherwise project beyond the top of the reflector.

By the above described construction, I am enabled to keep the height of the beam of light projected by the reflector down to parallelism with the top of the reflector and to also project the rays of the lamp downwardly below the lower edge of the reflector so that the ground immediately in front of the car will be amply lighted.

It will thus be seen that the light from the illuminant is divided into three fields—the direct light, the refracted light, and the reflected light, and that these light fields are shaped and directed so as to give the most advantageous lighting. The direct light is placed so as to illuminate strongly directly in front of and at the sides of the vehicle. The reflected light is directed forwardly and laterally (but not upwardly or downwardly) because of the flattening of the reflector, and this gives a moderate illumination over a wide extent both forwardly and laterally. The refracted light gives a fairly strong illumination somewhat farther forward and at the sides than the direct light and this refraction of the light prevents any of the light from being directed upwardly where it would dazzle the eyes of pedestrians.

In Figs. 4 and 5 I have illustrated a slightly modified structure of lens whereby the lens 10 is provided with a rib 21 for refracting purposes. In other respects the lens is very similar in construction to the lens illustrated in Figs. 1 to 3.

In Figs. 6 and 7 I have illustrated still another form of lens which, instead of being semi-circular as is the case in the lens illustrated in Figs. 1 to 5, is circular in form and takes more or less the form of a bull's-eye, being thicker at its center and tapering off toward its sides. This lens is particularly advantageous where it is desired to throw a beam of light a long distance ahead and, at the same time, prevent the direct rays of the lamp from being projected above or below the edge of the reflector.

Having thus described my invention what I claim as new and desire to secure by Letters Patent is:—

A vehicle light comprising a concave reflector having its axis horizontal, means for supporting a source of light in said reflector, and a refracting lens in said reflector immediately adjacent and in front of said source of light, the lower edge of said lens being substantially horizontal and on the same level as the center of said source of light, to permit the direct rays below a horizontal plane through said light center to pass beneath the lens, the upper edge of said lens being substantially semicircular and lying in the surface of a cone having its apex in said light center and the outline of its base defined by the front edge of the reflector, to intercept the direct light lying within said cone above the horizontal plane through said light, and to permit the direct rays outside of said cone above said horizontal plane to fall on the reflector, the angle of refraction of said lens at any point being substantially equal to the angle between the direct incident ray from said light center and the axis of said light center.

In witness whereof, I have hereunto subscribed my name in the presence of two witnesses.

REUBEN B. BENJAMIN.

Witnesses:
MARGARET THIELEN,
ANNE SOLOMON.